(12) United States Patent
Lavery et al.

(10) Patent No.: US 6,379,442 B1
(45) Date of Patent: Apr. 30, 2002

(54) INK COMPOSITION

(75) Inventors: Aidan Joseph Lavery, Buckinghamshire (GB); Bachaspati Roy, New Castle, DE (US); Janette Watkinson; Mark Kenworthy, both of Manchester (GB)

(73) Assignee: Avecia Limited, Blackley (GB)

( * ) Notice: Subject to any disclaimer, the term of this patent is extended or adjusted under 35 U.S.C. 154(b) by 0 days.

(21) Appl. No.: 09/446,969

(22) PCT Filed: Jun. 24, 1998

(86) PCT No.: PCT/GB98/01855

§ 371 Date: Apr. 6, 2000

§ 102(e) Date: Apr. 6, 2000

(87) PCT Pub. No.: WO99/01513

PCT Pub. Date: Jan. 14, 1999

(30) Foreign Application Priority Data

Jul. 3, 1997 (GB) .............................. 9714010

(51) Int. Cl.$^7$ .......................... C09D 11/02; B05D 1/26; B32B 3/00; B32B 27/14
(52) U.S. Cl. ................ 106/31.51; 106/31.48; 106/31.52; 534/701; 534/724; 427/466; 428/195
(58) Field of Search ............ 106/31.51, 31.48, 106/31.52; 534/701, 724; 427/466; 428/195

(56) References Cited

U.S. PATENT DOCUMENTS

| | | | | |
|---|---|---|---|---|
| 4,790,879 A | * | 12/1988 | Baxter et al. | 106/31.48 |
| 4,799,960 A | * | 1/1989 | Baxter et al. | 106/31.48 |
| 6,265,554 B1 | * | 7/2001 | Lehmann et al. | 106/31.51 |

FOREIGN PATENT DOCUMENTS

| | | |
|---|---|---|
| DE | 31 29 955 A1 | 4/1982 |
| GB | 850559 | 10/1960 |
| JP | 2-131983 | 5/1990 |
| WO | 94/16021 | 7/1994 |
| WO | 96/24636 | 8/1996 |

* cited by examiner

Primary Examiner—Helene Klemanski
(74) Attorney, Agent, or Firm—Pillsbury Winthrop LLP

(57) ABSTRACT

A composition comprising:
(a) a water-soluble magenta dye; and
(b) a dye of the Formula (1) or a salt thereof:

Formula (1)

wherein $R^1$, $R^2$, $R^3$ are defined in the description.

22 Claims, No Drawings

INK COMPOSITION

This invention relates to a composition comprising two or more dyes, to inks containing such compositions and to processes using said inks in printing and imaging technologies, especially ink jet printing.

Ink jet printing is a non-impact printing technique which involves ejecting, thermally or by action of an oscillating piezo crystal, droplets of ink continuously or on demand from a fine nozzle directly onto a substrate such as paper, plastics, textile, metal or glass. The inks used in an ink jet printer are required to meet a number of criteria. For example, they must provide sharp, non-feathered images which have good water-fastness, light-fastness and optical density. Furthermore, the inks must dry quickly when applied to a substrate, however, they must not dry or crust over in the ink jet head as this can result in clogging of the ink jet nozzle. The inks must also be stable to storage over long periods of time without deterioration in the properties of the ink.

We have surprisingly found that mixtures comprising a magenta dye and certain copper complex azo dyes are valuable as colorants for ink jet printing inks. In particular inks containing the mixture of dyes give enhanced operability in ink jet printers, and provide prints with a surprising increase in light-fastness and an improved print quality compared with inks containing the magenta dye alone. Many of the prints also exhibit a higher reflected optical density with little or no loss of chroma compared with prints obtained using the magenta dye alone.

According to a first aspect of the present invention, there is provided a composition comprising:
(a) a water-soluble magenta dye; and
(b) a dye of the Formula (1) or a salt thereof:

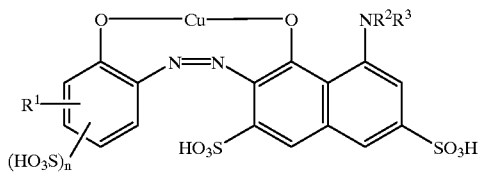

Formula (1)

wherein:
$R^1$ is H, halo, vinyl sulphonyl or a group which is convertible to vinyl sulphonyl on treatment with aqueous alkali;
$R^2$ is H or optionally substituted alkyl;
$R^3$ is acetyl, optionally substituted benzoyl or a group of the Formula (2):

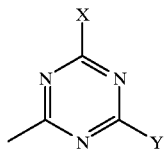

Formula (2)

X is a labile or a non labile atom or group;
Y is halo, $-NR^4R^5$, $-SR^5$ or $-OR^5$;
$R^4$ and $R^5$ each independently is H, optionally substituted alkyl, optionally substituted phenyl, or $R^4$ and $R^5$ together with the nitrogen to which they are attached form a 5 or 6 membered ring; and n is 0 or 1.

When $R^1$ is halo it is preferably F or Cl, more preferably Cl. It is especially preferred that when $R^1$ is halo it is attached ortho to the oxygen.

When $R^1$ is a group which is convertible to vinyl sulphonyl on treatment with aqueous alkali it is preferably of the formula $-SO_2CH_2CH_2OSO_3H$, $-SO_2CH_2CH_2SSO_3H$, $-SO_2CH_2CH_2Cl$ or $-SO_2CH_2CH_2OCOCH_3$.

$R^2$ is preferably H or optionally substituted $C_{1-4}$alkyl, more preferably H or $C_{1-4}$-hydroxyalkyl. It is especially preferred that $R^2$ is H.

When $R^3$ is optionally substituted benzoyl the optional substituent(s) is/are preferably selected from $C_{1-4}$alkyl, $C_{1-4}$alkoxy, $C_{1-4}$-hydroxyalkyl, $C_{1-4}$alkylamino, hydroxy-$C_{1-4}$-alkylamino, halo (especially F or Cl), hydroxy, carboxy, sulpho, nitro, amino and cyano. More preferably the benzoyl group is unsubstituted.

$R^3$ is preferably acetly, benzoyl or a group of the Formula (2).

When X represents a labile atom or group, it is preferably an atom or group which is bound by a covalent bond to the triazine nucleus, which atom or group is displaceable by a hydroxyl group of cellulose under mildly alkaline aqueous conditions to form a covalent bond between the triazine nucleus and cellulose. As examples of such atoms or groups represented by X there may be mentioned halo, for example F and Cl; sulphonic acid groups; thiocyano groups; quaternary ammonium groups, for example trialkylammonium groups and optionally substituted pyridinium groups, for example 3- and 4-carboxy pyridinium groups.

More preferably when X is a labile atom or group it is a quaternary ammonium group or halo, especially 3- or 4-carboxypyridinium, F or Cl, and more especially Cl.

When X is a non-labile group it is preferably $-OR^6$, $-SR^6$ or $-NR^7R^8$ wherein $R^6$, $R^7$ and $R^8$ are each independently H, optionally substituted alkyl, optionally substituted alkenyl, optionally substituted cycloalkyl, optionally substituted aralkyl, optionally substituted aryl or $R^7$ and $R^8$ together with the nitrogen atom to which they are attached form a 5 or 6 membered ring.

Preferably $R^6$, $R^7$ and $R^8$ are each independently selected from H; optionally substituted $C_{1-10}$-alkyl, more preferably optionally substituted $C_{1-4}$-alkyl; optionally substituted phenyl; and optionally substituted $-(CH_2)_{1-4}$-phenyl, especially optionally substituted benzyl.

The preferred optional substituents on $R^6$, $R^7$ or $R^8$ are selected from $C_{1-4}$-alkyl, $C_{1-4}$-alkoxy, $C_{1-4}$-alkylamino, $C_{2-4}$-hydroxyalkyl, di-($C_{1-4}$-alkyl)amino, $C_{2-4}$-hydroxyalkylamino di-($C_{2-4}$-hydroxyalkyl)amino, $-OH$, $-CN$, $-COOH$, $PO_3H_2$ and $NH_2$. More preferably the substituents are selected from $-OH$, $-CH_3$, $-OCH_3$, $-SO_3H$ and $-CO_2H$.

When $R^6$ and $R^7$ together with the nitrogen atom to which they are attached form a 5- or 6-membered ring it is preferably morpholine, piperidine or piperazine optionally substituted by $C_{1-4}$-alkyl or hydroxy-$C_{2-4}$-alkyl, more preferably it is piperazine optionally substituted at the 4-position by $C_{1-4}$-alkyl or hydroxy-$C_{2-4}$-alkyl.

Preferred groups of the formula $-OR^6$, $-SR^6$ or $-NR^6R^7$ include OH; SH; $C_{1-4}$-alkoxy, for example methoxy or ethoxy; mono- or di-($C_{2-4}$-hydroxyalkyl)amino, for example mono or di-(2-hydroxyethyl)amino; morpholinyl; piperidinyl; piperazinyl; 4-(hydroxy-$C_{2-4}$-alkyl)-piperazin-1-yl, for example 4-hydroxyethylpiperazin-1-yl; 4-($C_{1-4}$-alkyl)piperazin-1-yl, for example 4-methylpiperazin-1-yl; $C_{1-6}$-alkylamino, for example dimethylamino, n-butylamino or n-hexylamino; carboxy-$C_{1-4}$-alkylamino, for example 2-carboxymethylamino; arylamino, for example phenylamino, mono-3- or di-3,5-carboxyanilino; or aralkylamino, for example benzylamino, mono-3- or di-3,5-carboxyphenylmethylamino.

It is especially preferred that X is selected from Cl, —OH and —NHR$^9$ wherein R$^9$ is H, $C_{1-4}$-alkyl or $C_{2-4}$-hydroxyalkyl.

Y is preferably —NR$^4$R$^5$ or —OR$^5$.

Preferably R$^4$ and R$^5$ are each independently selected from H; optionally substituted $C_{1-10}$-alkyl, especially optionally substituted $C_{1-4}$-alkyl; and optionally substituted phenyl. Preferred optional substituents on R$^4$ and R$^5$ are selected from —OH, $C_{1-4}$-alkyl, $C_{1-4}$-alkoxy, $C_{1-4}$-alkoxycarbonyl-, $C_{1-4}$-alkylcarbonyl, —PO$_3$H$_2$, —COOH, —SO$_3$H, —NO$_2$, —CN, —NH$_2$, $C_{1-4}$-alkylamino-, hydroxy $C_{2-4}$-alkylamino- and hydroxy $C_{2-4}$-alkyl.

It is especially preferred that R$^4$ and R$^5$ are each independently selected from H, $C_{1-4}$-alkyl, hydroxy$C_{2-4}$-alkyl-, or phenyl optionally substituted by —SO$_3$H, —PO$_3$H$_2$, —COOH or —OH, more especially R$^4$ is H and R$^5$ is selected from H, $C_{1-4}$-alkyl, or phenyl optionally substituted by —COOH, —SO$_3$H, —PO$_3$H$_2$ or —OH.

When R$^4$ and R$^5$ together with the nitrogen to which they are attached form a 5 or 6 membered ring it is preferably a piperazine or morpholine ring.

Preferred groups represented by Y include, for example, —OH, phenoxy, —NH$_2$, sulphophenylamino (especially 3-sulphophenylamino) and phosphonophenylamino (especially 3-phosphonophenylamino).

In a first preferred embodiment component (b) of the composition is a dye of the Formula (1) wherein X is selected from Cl, —OH and —NHR$^9$ wherein R$^9$ is as hereinbefore defined; Y is —OH, phenoxy, —NH$_2$, sulphophenylamino or phosphonophenylamino; n is 0 or 1; and R$^1$ is Cl or vinylsulphone.

In view of the foregoing preferences, component (b) is a dye of the Formula (3), (4), (5) or (6) or a salt thereof:

Formula (3)

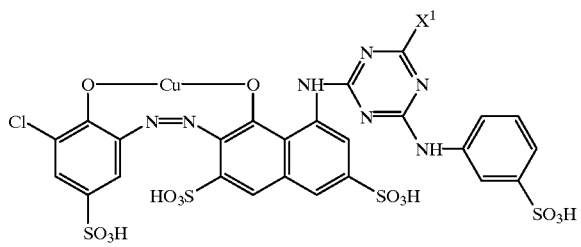

Formula (4)

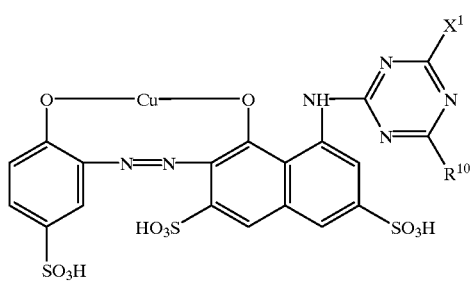

Formula (5)

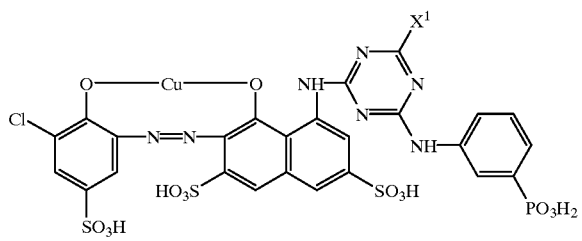

Formula (6)

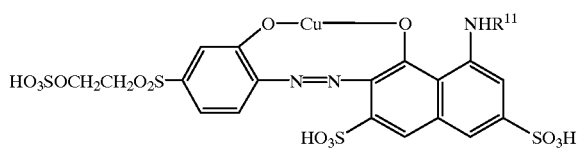

wherein:
each X$^1$ independently is Cl, OH or —NH$_2$;
R$^{10}$ is —NH$_2$ or phenoxy; and
R$^{11}$ is —COCH$_3$ or —COC6H$_5$.

It is especially preferred that component (b) is a compound of the Formula (3) wherein X$^1$ is Cl or —OH, and especially Cl.

The dye of Formula (1) may be prepared using known processes for the preparation of other similar azo compounds. For example, a suitable method comprises:

Stage (a)
diazotisation of the amine shown below in concentrated mineral acid with sodium nitrite at 0 to 5° C.:

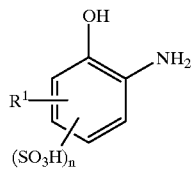

wherein R$^1$ and n are as hereinbefore defined;

Stage (b)
coupling the product of stage (a) with a compound of the formula:

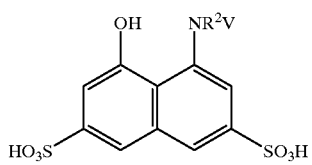

wherein:
R$^2$ is as hereinbefore defined; and
V is H, acetyl or optionally substituted benzoyl;
and isolating the resulting product using any convenient technique, for example salting out with NaCl and filtration;

Stage (c)
to a solution of the product of stage (b) in water is added sodium acetate copper sulphate and, preferably, a small quantity of acetic acid, the solution is then preferably heated at 60 to 80° C. The resulting product is isolated, preferably by salting out, to yield a dye of Formula (1) wherein $R^3$ is H, acetyl or optionally substituted benzoyl;

Stage (d)

when $R^3$ is a group of the Formula (2) the product of stage (c), wherein V is H, is condensed with cyanuric chloride to give a compound of the Formula (1) wherein X and Y are Cl;

Stage (e)

the product of stage (d) is then optionally condensed with a compound of the formula $Y^1H$ wherein $Y^1$ is as hereinbefore defined for Y, other than Cl;

Stage (f)

the product of stage (e) is then optionally condensed with a compound of the formula $X^1H$, wherein $X^1$ is as hereinbefore defined for X other than Cl, to yield the dye of Formula (1) wherein $R^3$ is a group of Formula (2).

In an alternative process an amine without a hydroxy ortho to the amino group may be used in stage (a) above. The product of stage (b) is then dissolved in a solution of water, sodium acetate, copper sulphate and preferably, a small quantity of acetic acid. The resulting mixture is then heated at 40° C. to 90° C. and an approximately 6% solution of hydrogen peroxide is added slowly over a period of 1–2 hours. The product may then be isolated as described above in stage (c), to yield the dye of Formula (1) wherein $R^3$ is H, acetyl or optionally substituted benzoyl.

The water-soluble magenta dye preferably has a maximum absorption wavelength in the range of from 490 to 550 nm.

Preferably the water-soluble magenta dye (component (a) of the composition) is not a dye of the Formula (1) as hereinbefore defined.

The water-soluble magenta dye is preferably an azo or bis azo dye, more preferably an anionic azo or bis azo dye and especially an azo or bis azo dye which contains one or more groups selected from sulphonate, carboxylate and thiocarboxylate groups. Preferably the water-soluble magenta dye is not a metallised dye.

A preferred water-soluble magenta dye is of the Formula (6A) or a salt thereof:

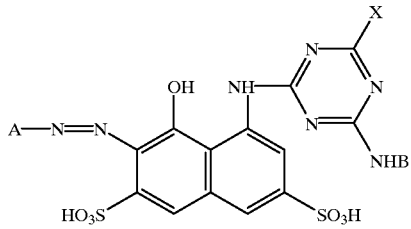

Formula (6A)

wherein:

each A and B independently is an optionally substituted aromatic group; and

X is a labile or non-labile group as hereinbefore defined.

Preferably A and B are each independently, a phenyl or naphthyl group carrying at least one —SO$_3$H and/or —COOH group and optionally one or more further substituent.

Preferred further substituent which are optionally present on A and B are selected from $C_{1-4}$-alkyl, $C_{1-4}$-alkoxy, $C_{2-4}$-hydroxyalkyl, —OH and —NH$_2$.

X is preferably $X^1$ as hereinbefore defined.

Preferred water-soluble magenta dyes of Formula (6A) include, for example, dyes of the Formulae (7) to (10) and salts thereof,

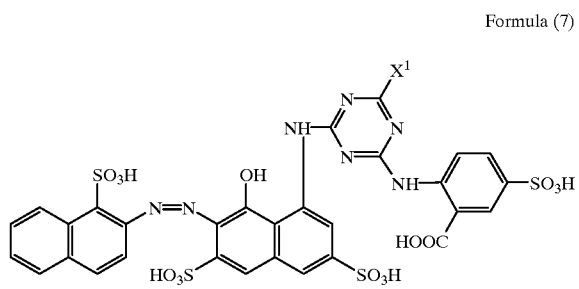

Formula (7)

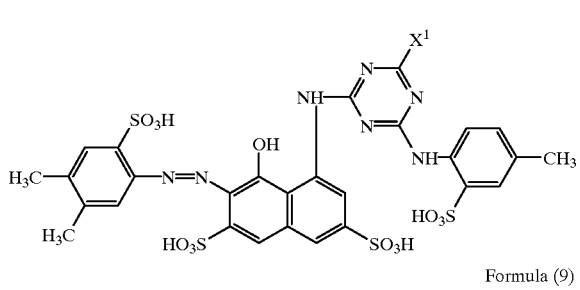

Formula (8)

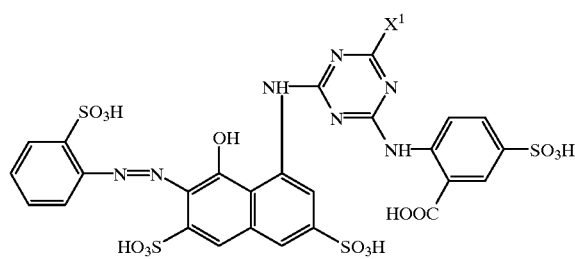

Formula (9)

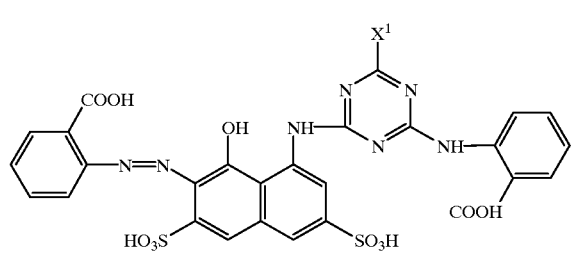

Formula (10)

wherein $X^1$ is as hereinbefore defined, especially Cl or OH.

The magenta dyes, of Formula (6A) may be prepared using known processes analogous to those used for the preparation of similar azo compounds. For example, a suitable process comprises:

(i) diazotising an aromatic amine of the formula ANH$_2$, preferably using, sodium nitrite in a concentrated mineral acid, for example hydrochloric acid at a temperature of 0 to 5° C.;

(ii) coupling the diazonium salt resulting from step (i) with 1-amino-8-naphthol-3,6-disulphonic acid;

(iii) condensing the resulting azo compound with cyanuric chloride;

(iv) condensing the dichlorotriazine from step (iii) with an amine of the formula NH$_2$B and optionally;

(v) optionally further condensing the dye with a compound $X^1H$.

Dyes of the Formula (1) may also be prepared, for example, using the method described in Example 1 of EP 0 628 088.

A preferred bis-azo water-soluble magenta dye is of the Formula (11) or a salt or tautomer thereof:

Formula (11)

wherein:
each J independently is

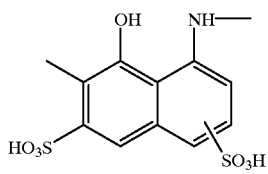

Ar$^1$ and Ar$^2$ are each independently aryl each of which carries one or two groups selected from carboxy and sulpho;
L is a divalent organic linking group;
each W independently is a group of the Formula (12), (13) or (14):

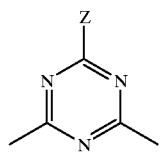
(12)

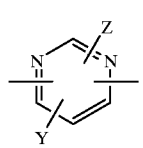
(13)

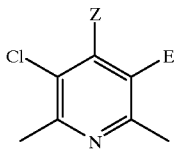
(14)

each Z independently is halogen, NR$^{12}$R$^{13}$, SR$^{14}$ or OR$^{14}$;
each Y independently is Z or H;
each E independently is Cl or CN; and
R$^{12}$, R$^{13}$ and R$^{14}$ are each independently H, optionally substituted alkyl, optionally substituted alkenyl, optionally substituted cycloalkyl, optionally substituted aryl, optionally substituted aralkyl or R$^{12}$ and R$^{13}$ together with the nitrogen atom to which they are attached form a 5 or 6 membered ring, for example a piperazine or morpholine ring.

Preferably Ar$^1$ and Ar$^2$ are each independently phenyl or naphthyl carrying one or two groups selected from carboxy and sulpho. It is especially preferred that Ar$^1$ and Ar$^2$ are phenyl carrying one or, preferably, two carboxy groups.

L is preferably a diamine of the formula —NR$^{15}$L$^1$NR$^{16}$— wherein R$^{15}$ and R$^{16}$ are each independently H or optionally substituted C$_{1-4}$-alkyl; and L$^1$ is a divalent optionally substituted aliphatic or aromatic group. Alternatively the group —NR$^{15}$L$^1$NR$^{16}$— may form a divalent 5 or 6 membered ring, for example a piperazinylene ring optionally substituted by one or more groups selected from C$_{1-4}$-alkyl and C$_{1-4}$-hydroxyalkyl.

It is especially preferred that R$^{15}$ and R$^{16}$ are H; and L$^1$ is phenylene or benzylene optionally substituted by C$_{1-4}$-alkyl or hydroxy-C$_{1-4}$-alkyl. When the group —NR$^{15}$L$^1$NR$^{16}$— forms a divalent 5 or 6 membered ring it is preferably a piperazinylene ring optionally substituted by one or, preferably two, groups selected from methyl, ethyl and hydroxyethyl, for example 2,5-dimethyl piperazin-1,4-ylene.

The dyes of Formula (11) are described in EP 0 468 648 A1 (page 3 to page 10, line 39), EP 559 310 A1 (page 1 to page 6, line 26 and page 8, line 10 to page 15, line 40), and international patent publication number WO94/16021 (page 1 to page 6, line 37 and page 9, line 7 to page 17, line 11) which are incorporated herein by reference thereto.

Preferred dyes of Formula (11) include for example, dyes of the Formulae (15) and (16) and salts thereof.

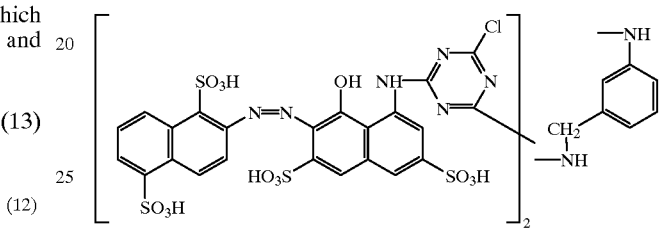
Formula (15)

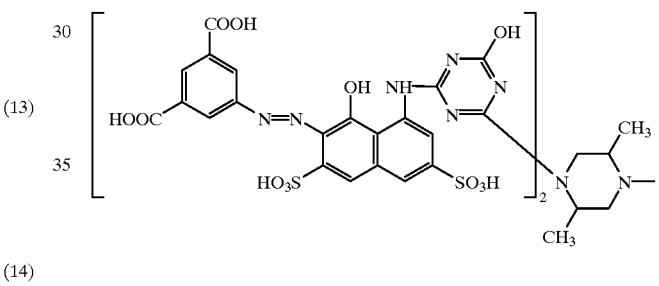
Formula (16)

The dyes of the Formulae (15) and (16) may be prepared using processes analogous to those known in the art for the preparation of other similar bis azo dyes. For example, the dye of Formula (15) may be prepared using the method described in Example 1 of EP 0 559 310. The dye of the Formula (16) may be prepared using the method described in Example 3 of PCT publication number WO 94/16021.

A further preferred water-soluble magenta dye is of the Formula (17) or a salt thereof:

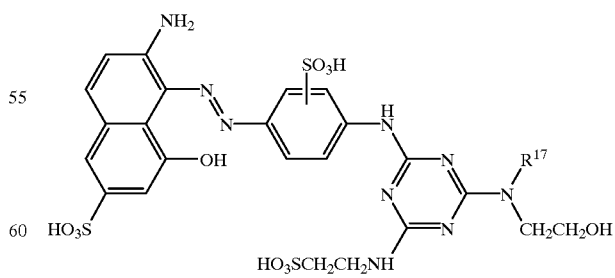
Formula (17)

wherein:
R$^{17}$ is H or hydroxyethyl.

A preferred dye of the Formula (17) is a dye of the Formula (18) or a salt thereof:

Dye (18)

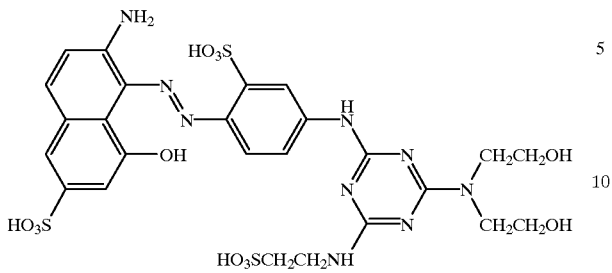

The dyes of Formula (17) may be prepared using conventional techniques, for example the method described on pages 5 and 6 and Example 1 of PCT publication number WO 96/24636.

A still further preferred water-soluble magenta dye is of the Formula (19) or a salt thereof:

Formula (19)

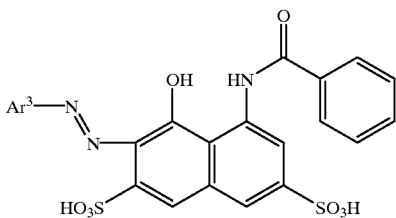

wherein $Ar^3$ is optionally substituted aryl.

$Ar^3$ is preferably optionally substituted phenyl or optionally substituted naphthyl.

More preferably $Ar^3$ is phenyl or naphthyl each of which carries one or more groups selected from —COOH and —$SO_3H$, and each of which is optionally further substituted by one or more groups selected from optionally substituted alkyl or optionally substituted alkoxy.

It is especially preferred that $Ar^3$ is sulphonaphth-2-yl, or sulphophen-2-yl optionally substituted by $C_{1-6}$-alkyl or $C_{1-6}$-alkoxy.

Preferred dyes of the Formula (19) are of the Formulae (20) and (21) and salts thereof:

Formula (20)

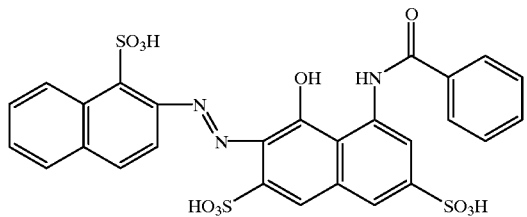

Formula (21)

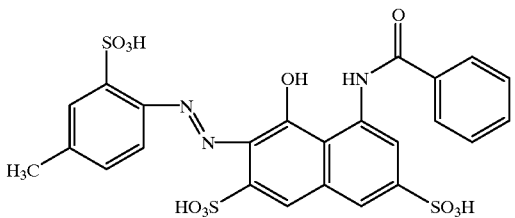

The composition according to the first aspect of the present invention preferably comprises:
(a) from 2 to 50, more preferably from 3 to 30 and especially from 5 to 15 parts of a dye of Formula (1); and
(b) from 50 to 98, more preferably from 50 to 97 parts and especially 85 to 95 parts of a water-soluble magenta dye;
wherein the parts are by weight and the sum of the parts (a) and (b)=100.

The composition may contain a single dye of Formula (1) or a mixture thereof, for example a mixture of a dye of Formula (2) and a dye of Formula (3). Similarly, the composition may contain a single water-soluble magenta dye or a mixture of two or more water-soluble magenta dyes.

The present invention covers all tautomeric forms of the dyes shown in this specification, for example the hydrazo tautomers.

In view of the foregoing preferences a preferred composition comprises:
(i) from 2 to 50 parts in total of one or more dyes selected from a dye of the hereinbefore defined Formula (3), (4), (5) and (6) and salts and tautomers thereof; and
(ii) from 50 to 98 parts in total of one or more dyes selected from a dye of the hereinbefore defined Formula (7), (8), (9), (10), (15), (16), (18), (20) and (21) and salts and tautomers thereof;
wherein all parts are by weight and the sum of the parts (i) and (ii)=100.

According to a second aspect of the present invention there is provided a composition comprising:
(i) a composition according to the first aspect of the present invention; and
(ii) a cyan dye.

The cyan dye is preferably a water-soluble cyan dye, more preferably a water-soluble copper phthalocyanine dye, especially C.I. Direct Blue 199, C.I. Acid Blue 9, C.I. Direct Blue 307 or C.I. Reactive Blue 71, more especially C.I. Direct Blue 199.

The composition according to the second aspect of the present invention preferably comprises:
(i) up to 30, more preferably from 1 to 20 parts of one or more of the cyan dye(s);
(ii) from 0.5 to 50 parts, more preferably 1 to 20 parts of a dye of Formula (1); and
(iii) from to 0.5 to 98 parts, more preferably 60 to 95 parts in total of one or more water-soluble magenta dye(s);
wherein all parts are by weight and the sum of the parts (i)+(ii)+(iii)=100.

A preferred composition according to the second aspect of the present invention is where component (ii) is selected from a dye of the hereinbefore defined Formula (3), (4), (5) and (6); component (iii) is selected from a dye of the hereinbefore defined Formula (7), (8), (9), (10), (15), (16), (18), (20) and (21); and component (i) is a cyan dye selected from C.I.Acid Blue 9, C.I.Direct Blue 199, C.I.Direct Blue 307, C.I.Reactive Blue 71 and C.I.Direct Blue 85 (especially C.I Direct Blue 199).

The compositions according to the second aspect of the present invention are particularly useful when incorporated into inks for use in ink jet printers because they provide high quality prints with a good optical density and a high lightfastness compared to inks containing a cyan dye and a water-soluble magenta dye alone (i.e. without the dye of Formula (1)).

The dyes present in the compositions according to the first and second aspects of the invention may be in free acid form but are preferably in the form of water-soluble salts. Preferred salts are alkali metal salts, especially lithium, sodium and potassium salts, ammonium and substituted ammonium salts. Especially preferred salts are salts with ammonia and volatile amines. The dyes may be converted into a salt using known techniques. For example, an alkali metal salt of a dye may be converted into a salt with ammonia or an amine by dissolving the dye in the form of a salt with an alkali metal, acidifying with a mineral acid and adjusting the pH of the solution to pH 9 to 9.5 with ammonia or the amine and removing the alkali metal cations by dialysis.

According to a third aspect of the present invention, there is provided an ink comprising:
 (i) a composition according to the first or second aspect of the present invention; and
 (ii) a liquid medium or a low melting point solid medium.

The ink preferably contains from 0.5 to 20, more preferably from 0.5 to 15, and especially from 1 to 3 parts, by weight based upon the total weight of the ink of the composition according to the first aspect of the present invention. The preferred dye compositions present in the ink are the preferred compositions hereinbefore defined for the first and second aspects of the present invention.

When the medium is a liquid, the components present in the composition according to the first or second aspect of the present invention are preferably dissolved completely in the medium to form a solution. Preferably the dyes present in the ink have a solubility of 10% or more in the medium because this allows the preparation of concentrates which may be used to prepare more dilute inks and to minimise the chance of precipitation of colorant if evaporation of the liquid medium occurs during storage of the ink.

When the medium is a liquid it preferably comprises (a) water; (b) a mixture of water and one or more organic solvent(s); or (c) an organic solvent.

When the medium comprises a mixture of water and one or more organic solvent(s), the weight ratio of water to organic solvent(s) is preferably from 99:1 to 1:99, more preferably from 99:1 to 50:50 and especially from 95:5 to 80:20.

It is preferred that the organic solvent(s) present in the mixture of water and organic solvent(s) are water-miscible organic solvent(s). Preferred water-miscible organic solvent(s) are selected from $C_{1-4}$-alkanols, for example methanol, ethanol, n-propanol, isopropanol, n-butanol, sec-butanol, tert-butanol, isobutanol and n-pentanol; cyclic alkanols, for example cyclohexanol and cyclopentanol; diols, preferably diols with 2 to 12 carbon atoms, for example pentane-1,5-diol and hexane-1,6-diol; amides, for example dimethylformamide or dimethylacetamide; amines, for example triethanolamine ethanolamine and diethanolamine; ketones or ketone-alcohols, for example acetone, methyl ether ketone, cyclohexanone and diacetone alcohol; ethers, for example tetrahydrofuran or dioxane; oligo- or poly-alkyleneglycols, for example diethylene glycol, triethylene glycol, hexylene glycol, polyethylene glycol and polypropylene glycol; alkyleneglycols or thioglycols containing a $C_2$–$C_6$-alkylene group, for example ethylene glycol, propylene glycol, butylene glycol, pentylene glycol hexylene glycol and thiodiglycol; polyols, for example glycerol and 1,2,6-hexanetriol; $C_{1-4}$-alkyl-ethers of polyhydric alcohols, for example 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)ethoxy]-ethanol, 2-(2-butoxyethoxy)ethanol and ethyleneglycolmonoallylether; cyclic amides, for example 2-pyrrolidone, N-methyl-2-pyrrolidone, N-ethyl-2-pyrrolidone, caprolactam and 1,3-dimethylimidazolidone; cyclic esters, for example caprolactone and γ-butyrolactone; sulphoxides, for example dimethyl sulphoxide and sulpholane or mixtures containing two or more, especially from 2 to 8, of the aforementioned water-miscible organic solvents, for example thiodiglycol and a second glycol or diethylene glycol and 2-pyrrolidone.

Especially preferred water-miscible organic solvents are 2-pyrrolidone; N-methyl-pyrrolidone; alkylene- and oligo-alkylene-glycols, for example ethyleneglycol, diethyleneglycol, triethyleneglycol; and lower alkyl ethers of polyhydric alcohols, for example 2-methoxy-2-ethoxy-2-ethoxyethanol; and polyethyleneglycols with a molecular weight of up to 500.

A preferred mixture of water and water-miscible organic solvents comprises:
 (a) from 60 to 80 parts water; and
 (b) from 0.5 to 25 parts in total of one or more compounds selected from diethylene glycol,2-pyrrolidone, N-methylpyrrolidone, cyclohexanol, caprolcatone, caprolactam, pentane-1,5-diol, 2-(2-butoxyethoxy) ethanol and thiodiglycol;
wherein the parts are by weight and the sum of the parts (a) and (b)=100.

Examples of further suitable ink media comprising a mixture of water and one or more organic solvent(s) are given in U.S. Pat. Nos. 4,963,189, 4,703,113, 4,626,284 and EP 4,251,50A which are incorporated herein by reference thereto.

When the medium comprises an organic solvent it preferably has a boiling point of from 0 to 300° C., more preferably of from 50 to 200° C. The organic solvent may be water-immiscible or water-miscible. Preferred water-miscible organic solvents are any of the hereinbefore mentioned water-miscible organic solvents Preferred water-immiscible solvents include, for example, aliphatic hydrocarbons, esters, for example ethyl acetate, chlorinated hydrocarbons, for example $CH_2Cl_2$ and ethers, for example diethyl ether.

When the medium comprises a water-immiscible organic solvent a polar solvent such as an alcohol, ester, ether or amide is preferably added to enhance the solubility of the dyes in the medium. In view of the foregoing preferences it is especially preferred that where the medium comprises an organic solvent, it is selected from ketones, especially methyl ethyl ketone and alkanols especially ethanol and n-propanol.

The organic solvent medium may comprise a single organic solvent or a mixture of two or more organic solvents. It is preferred that the medium comprises a mixture of 2 to different organic solvents because this allows a medium to be selected which gives optimum control over the characteristics of the ink.

Ink media comprising an organic solvent are used where fast drying times are required and particularly when printing onto hydrophobic and non absorbent substrates such as plastics, metal or glass.

When the medium for an ink composition comprises a low melting point solid, the melting point of the solid is preferably in the range from 60° C. to 125° C. Suitable low melting point solids include long chain fatty acids or alcohols, preferably those with $C_{18-24}$ chains and sulphonamides. The composition according to the first aspect of the present invention may be dissolved in the low melting point solid or may be finely dispersed in it.

The compositions according to the first and second aspects of the present invention are particularly useful as colorants for aqueous inks because they exhibit high solubility in water and in aqueous media. Accordingly, it is preferred that the ink medium is water or, more preferably a mixture of water and one or more water-miscible organic solvent(s).

In view of the forgoing preferences, a preferred ink composition comprises:

(a) 0.01 to 10 parts of a dye of Formula (1) (more preferably a dye of the hereinbefore defined Formula (3), (4), (5) or (6)) or a salt or tautomer thereof);

(b) 0.49 to 20 parts of a water-soluble magenta dye (more preferably a dye of the hereinbefore defined Formula (7), (8), (9), (10), (15), (16), (18), (20) and (21) and salts and tautomers thereof;

(c) 0 to 10 parts of a water-soluble cyan dye;

(d) 2 to 60 parts of water-miscible organic solvent(s); and (e) 1 to 95 parts water;

wherein all parts are parts by weight and the sum of the parts (a), (b), (c), (d) and (e)=100.

In addition to the components (a), (b), (c), (d) and (e) the ink may contain other additional components conventionally used in ink jet printing inks, for example viscosity and surface tension modifiers, corrosion inhibitors, kogation reducing additives, and surfactants which may be ionic or non-ionic.

According to a fourth aspect of the present invention there is provided a set of inks comprising:

(i) a magenta ink comprising a composition according to the first aspect of the present invention and a medium;

(ii) a cyan ink comprising a cyan colorant and a medium; and (iii) optionally one or more inks selected from a yellow ink and a black ink.

The preferred composition in the magenta ink is the preferred composition according to the first aspect of the present invention.

The cyan ink preferably comprises a water-soluble cyan dye as hereinbefore defined in the second aspect of the present invention, especially C.I. Direct Blue 199.

Preferred yellow inks comprise a medium and a dye selected from C.I. Acid Yellow 23, C.I Direct Yellow 89, C.I Direct Yellow 132, C.I Direct Yellow 142 and C.I Direct Yellow 173.

Preferred black inks comprise a medium and a dye selected from C.I Direct Black 19, C.I Direct Black 168, and especially C.I Direct Black 195.

The medium in each the ink is preferably independently as defined in the third aspect of the invention. It is especially preferred that the medium in each ink independently comprises a mixture of water and one or more water-soluble organic solvent.

According to a fifth aspect of the present invention, there is provided a process for printing a substrate comprising applying an ink to the substrate by means of an ink jet printer wherein the ink contains a composition according to the first aspect of the present invention.

The ink for the process according to the fifth aspect of the invention is preferably an ink according to the third aspect of the invention or one or more of the inks from the ink set according to the fourth aspect of the invention.

The ink jet printer preferably applies the ink to the substrate in the form of droplets which are ejected through a small orifice onto the substrate.

Preferred ink jet printers are drop on demand (DOD) and continuous ink jet printers. In DOD ink jet printing small droplets of ink are ejected from a reservoir through a small orifice in response to an electrical recording signal so that the droplets of ink are directed at a substrate. Preferred DOD ink jet printers are piezoelectric ink jet printers and thermal ink jet printers. In thermal ink jet printing, programmed pulses of heat are applied to the ink in the reservoir by means of a resistor adjacent to the orifice, during relative movement between the substrate and the reservoir. In piezoelectric printers the ink reservoir is formed from a suitable piezo-electric material which expands and contacts in response to an electrical recording signal and thereby ejects ink droplets from the nozzle towards the substrate.

In continuous ink jet printers a stream of ink droplets are ejected from a small orifice and electrical fields are used to either direct the droplets towards a substrate or into a gutter for recycling. When a continuous ink jet printing technique is used the ink composition preferably also contains a conducting material such as an ionised salt to enhance and stabilise the charge applied to the ink drops during ejection from the printer head. Suitable salts for this purpose are alkali metal salts of mineral acids.

The substrate in the present process is preferably paper, plastic, textile, metal or glass, more preferably paper, an overhead projector slide or a textile material, and especially paper.

Preferred papers are plain or treated papers which may have an acid, alkaline or neutral character. Examples of commercially available papers include, HP Premium Coated Paper, HP Photopaper (all available from Hewlett Packard Inc), Stylus Pro 720 dpi Coated Paper, Epson Photo Quality Glossy Film, Epson Photo Quality Glossy Paper (available from Seiko Epson Corp.), Canon HR 101 High Resolution Paper, Canon GP 201 Glossy Paper, Canon HG 101 High Gloss Film (all available from Canon Inc.), Wiggins Conqueror paper (available from Wiggins Teape Ltd), Xerox Acid Paper and Xerox Alkaline paper.

Preferred textile materials are natural, synthetic and semi-synthetic materials Examples of preferred natural textile materials include wool, silk, hair and cellulosic materials, particularly cotton, jute, hemp, flax and linen. Examples of preferred synthetic and semi-synthetic materials include polyamides, polyesters, polyacrylonitriles and polyurethanes.

According to a sixth aspect of the present invention, there is provided a paper an overhead projector slide or a textile material printed with an ink composition as hereinbefore defined for the third aspect of the present invention, or by means of the process according to the fifth aspect of the present invention.

According to a seventh aspect of the present invention, there is provided a process for the coloration of a textile material with an ink as defined for the third aspect of the present invention which comprises the steps:

i) applying the ink to the textile material by means of an ink jet printer; and ii) heating the textile material at a temperature of from 50° C. to 250° C.

The process for coloration of a textile material by ink jet printing preferably comprises a pre-treatment of the textile material with an aqueous pre-treatment composition comprising a water-soluble base, a hydrotropic agent and a thickening agent followed by removing water from the pre-treated textile material to give a dry pre-treated textile material which is subjected to ink jet printing in step i) above.

The pre-treatment composition preferably comprises a solution of the base and the hydrotropic agent in water containing the thickening agent.

The base is preferably an inorganic alkaline base, especially a salt of an alkali metal with a weak acid such as an alkali metal carbonate, bicarbonate or silicate or an alkali metal hydroxide. The amount of base may be varied within wide limits provided sufficient base is retained on the textile material after pre-treatment to promote the dyeing of the pre-treated textile material. Where the base is sodium bicarbonate it is convenient to use a concentration of from 1% to 5% by weight based on the total weight of the composition.

The hydrotropic agent is present to provide sufficient water to promote the fixation reaction between the dyes and the textile material during the heat treatment, in step (ii) above, and any suitable hydrotropic agent may be employed. Preferred hydrotropic agents are urea, thiourea and dicyandiamide. The amount of hydrotropic agent depends to some extent on the type of heat treatment. If steam is used for the heat treatment, generally less hydrotropic agent is required than if the heat treatment is dry, because the steam provides a humid environment. The amount of hydrotropic agent required is generally from 2.5% to 50% by weight of the total composition with from 2.5% to 10% being more suitable for a steam heat treatment and from 20% to 40% being more suitable for a dry heat treatment.

The thickening agent may be any thickening agent suitable for use in the preparation of print pastes for the conventional printing of cellulose reactive dyes. Suitable thickening agents include alginates, especially sodium alginate, xantham gums, monogalactam thickeners and cellulosic thickeners. The amount of the thickening agent can vary within wide limits depending on the relationship between concentration and viscosity. However, sufficient agent is preferred to give a viscosity from 10 to 1000 mPa.s, preferably from 10 to 100 mPa.s, (measured on a Brookfield RVF Viscometer). For an alginate thickener, this range can be provided by using from 10% to 20% by weight based on the total weight of the pre-treatment composition.

The remainder of the pre-treatment composition is preferably water, but other ingredients may be added to aid fixation of the dye to the textile material or to enhance the clarity of print by inhibiting the diffusion (migration) of dye from coloured areas to non-coloured areas before fixation.

Examples of fixation enhancing agents are cationic polymers, such as a 50% aqueous solution of a dicyanamide/phenol formaldehyde/ammonium chloride condensate e.g. MATEXIL™ FC-PN (available from ICI), which have a strong affinity for the textile material and the dye and thus increase the fixation of the dye on the textile material.

Examples of anti-migration agents are low molecular weight acrylic resins, e.g. polyacrylates, such as poly(acrylic acid) and poly(vinyl acrylate).

In the pre-treatment stage of the present process, the pre-treatment composition is preferably evenly applied to the textile material. Where a deeply penetrated print or a deep shade is required, the pre-treatment composition is preferably applied by a padding or similar process so that it is evenly distributed throughout the material. However, where only a superficial print is required the pre-treatment composition can be applied to the surface of the textile material by a printing procedure, such as screen or roller printing, ink jet printing or bar application.

In the pre-treatment stage of the present process, water may be removed from the pretreated textile material by any suitable drying procedure such as by exposure to hot air or direct heating, e.g. by infra-red radiation, or micro-wave radiation, preferably so that the temperature of the material does not exceed 100° C.

The application of the ink composition to the textile material, stage (i) of the present process, may be effected by any ink Jet printing technique, whether drop on demand (DOD) or continuous flow as hereinbefore described. The ink composition, preferably also contains a humectant to inhibit evaporation of water and a preservative to inhibit the growth of fungi, bacteria and/or algae in the solution. Examples of suitable humectants are, propan-1,2-diol, butan-1,2diol, butan-2,3-diol and butan-1,3-diol. However, the presence of small amounts, up to about 10%, preferably not more than 5%, in total, of polyols having two or more primary hydroxy and/or primary alcohols is acceptable, although the composition is preferably free from such compounds.

After application of the ink composition, it is generally desirable to remove water from the printed textile material at relatively low temperatures (<100° C.) prior to the heat applied to fix the dye on the textile material as this has been found to minimise the diffusion of the dye from printed to non-printed regions. As with the pre-treated textile material removal of water is preferably by heat, such as by exposure to hot air or to infra-red or micro-wave radiation.

In stage (ii) of the present process, the printed textile material is submitted to a short heat treatment, preferably after removal of water by low-temperature drying, at a temperature from 100° C. to 200° C. by exposure to dry or steam heat for a period of up to 20 minutes. If a steam (wet) heat treatment is used, the printed material is preferably maintained at 100–105° C. for from 5 to 15 minutes whereas if a dry heat treatment is employed the printed material is preferably maintained at 140–160° C. for from 2 to 8 minutes.

After allowing the textile material to cool, unfixed dye and other ingredients of the pre-treatment and dye compositions may be removed from the textile material by a washing sequence, involving a series of hot and cold washes in water and aqueous detergent solutions before the textile material is dried.

Preferred textile materials for use in the process according to the seventh aspect of the present invention are as hereinbefore defined for the fifth aspect of the present invention.

According to an eighth aspect of the present invention there is provided a textile material, especially a cellulosic textile material, coloured by means of the process according to the seventh aspect of the present invention.

According to a ninth aspect of the present invention there is provided an ink jet printer cartridge, preferably a refillable cartridge, containing an ink according to the third aspect of the present invention.

The invention is further illustrated by the following Examples in which all parts and percentages are by weight unless otherwise stated.

EXAMPLE 1

Water Soluble Magenta Dye: Dye(1)

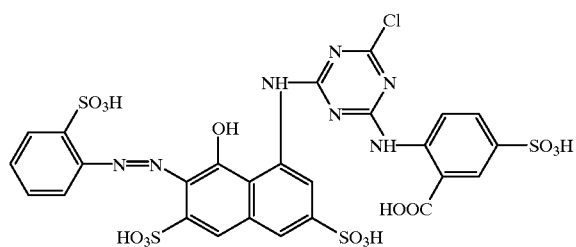

Dye (1)

Dye (1) was prepared using the process described in Example 4 of International Publication number W094122961 except in place of 2-amino4,5-dimethylbenzene sulphonic acid there was used 2-amino benzene sulphonic acid.

Dye A (Dye of Formula (1))

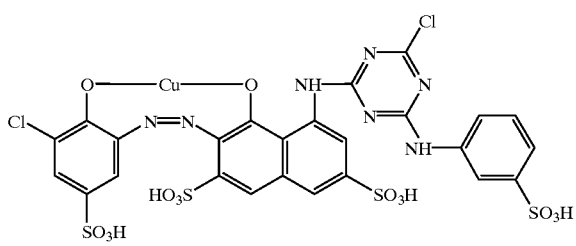

Dye A

Dye A was prepared using the process described in Example 1 of GB 850,559.

Ink Preparation

Inks 1 and 2 and Comparative Ink 1 shown in Table A below were prepared by dissolving the dye(s) shown (3.0 g) in water (8.5 g) by adding concentrated ammonia to adjust the pH to 9. 2-pyrrolidone (0.5 g), thiodiglycol (0.5 g) and Surfynol 465 (0.2 g) were then added and the mixture was shaken to thoroughly mix the components. The resulting ink was then filtered through a 0.45 μm filter.

TABLE A

| | Component (Parts) | | | | | |
|---|---|---|---|---|---|---|
| Ink | Dye A | Dye (1) | 2-Pyrrolidone | Thiodi-glycol | Surfynol* 465 | Water |
| Ink 1 | 0.3 | 2.7 | 5 | 5 | 2 | 85 |
| Ink 2 | 1.5 | 1.5 | 5 | 5 | 2 | 85 |
| Comparative Ink 1 | — | 3.0 | 5 | 5 | 2 | 85 |

*Surfynol 465 is a surfactant commercially available from Air Products Inc.

Ink Jet Printing

The inks were loaded into a HP560c Kukla ink jet printing cartridge (available from Hewlett Packard) and were printed onto the papers shown in Table 1 using a HP560 ink jet printer. After drying, each of the resulting prints was half covered and faded in an Atlas™ Ci35a weatherometer for 50 hours. After exposure in the weatherometer, the light fastness of the prints was assessed by measuring the colour difference (ΔE) between the faded and unfaded portion of each print using an X-Rite™ 938 spectrodensitometer. The light fastness of the prints on each paper type is shown in Table 1 under the column marked "light fastness (ΔE)". The ΔE value shown in Table 1 is a measure of the colour change resulting from exposure to light in the spectrodensitometer. Thus, the prints with a low ΔE value exhibit a high light fastness because they did not fade significantly when exposed to light in the weatherometer.

TABLE 1

| | Light fastness (ΔE) | | | |
|---|---|---|---|---|
| Ink | Xerox Acid | Xerox Alkali | Conqueror | HP Coated |
| Ink 1 | 5.7 | 6.9 | 7.2 | 20.8 |
| Ink 2 | 6.1 | 8.8 | 6.0 | 24.1 |
| Comparative Ink 1 (no Dye A present) | 7.2 | 10.5 | 9.6 | 29.1 |

Table 1 clearly shows that Inks 1 and 2, which contain a composition according to the present invention, give prints which exhibit a higher light-fastness than those obtained using an ink containing Dye (1) alone.

EXAMPLE 2

Dye A

Dye A was prepared as in Example 1.

Dye (2) (water-soluble magenta dye):

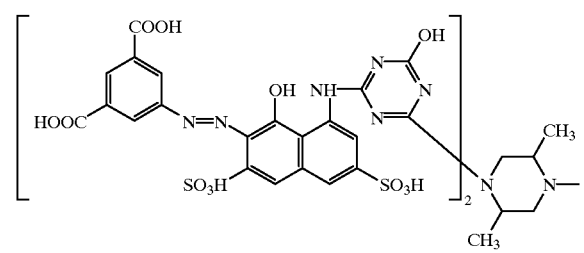

Dye (2)

Dye (2) was prepared using the method described in Example 3 of WO 94/16021.

Inks

The inks shown in Table 2 were formulated as described in Example 1.

TABLE 2

| | Component (Parts) | | | | | |
|---|---|---|---|---|---|---|
| Ink | Dye A | Dye (2) | 2-Pyrrolidone | Thiodi-glycol | Surfynol 465 | Water |
| Ink 3 | 0.3 | 2.7 | 5 | 5 | 2 | 85 |
| Ink 4 | 1.5 | 1.5 | 5 | 5 | 2 | 85 |
| Comparative Ink 2 | — | 3.0 | 5 | 5 | 2 | 85 |

Ink Jet Printing

The inks shown in Table 2 were printed onto the papers shown in Table 3 using the same ink jet printer described in Example 1. The light-fastness of the resulting prints shown in Table 3 was assessed using the same method described in Example 1.

TABLE 3

| Ink | Light Fastness (ΔE) | | | |
|---|---|---|---|---|
| | Xerox Acid | Xerox Alkaline | Conqueror | HP Coated |
| Ink 3 | 16.1 | 18 | 18 | 44 |
| Ink 4 | 11.4 | 12.8 | 10 | 35.1 |
| Comparative Ink 2 (no Dye A) | 17.5 | 19.5 | 18.1 | 49.9 |

EXAMPLE 3

Dye A

Dye A was prepared as described in Example 1.

Dye (3) (water soluble magenta dye)

Dye (3)

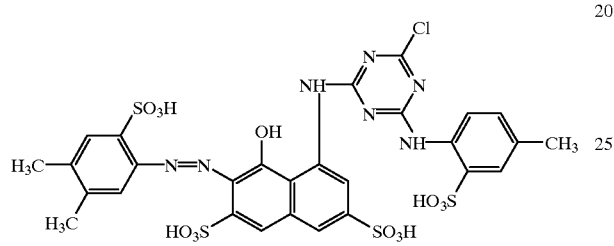

Dye (3) was prepared using the method described in Example 19 of WO 94/22961.

Ink Formulations

The inks shown in Table 4 were prepared using the method described in Example 1.

TABLE 4

| Ink | Component (Parts) | | | | | |
|---|---|---|---|---|---|---|
| | Dye A | Dye (3) | 2-Pyrrolidone | Thiodi-glycol | Surfynol 465 | Water |
| Ink 5 | 0.3 | 2.7 | 5 | 5 | 2 | 85 |
| Ink 6 | 1.5 | 1.5 | 5 | 5 | 2 | 85 |
| Comparative Ink 3 | — | 3.0 | 5 | 5 | 2 | 85 |

Ink Jet Printing

The inks shown in Table 4 were ink jet printed onto the papers shown in Table 5 using the same ink jet printer described in Example 1. The light fastness of the resulting prints shown in Table 5 was measured using the same method described in Example 1.

TABLE 5

| Ink | Light Fastness (ΔE) | | | | |
|---|---|---|---|---|---|
| | Xerox Acid | Xerox Alkaline | Conqueror | HP Coated | HP Glossy |
| Ink 5 | 10.4 | 11 | 11.5 | 34.1 | 74.7 |
| Ink 6 | 6.4 | 8.1 | 6.7 | 24.3 | 49.9 |
| Comparative Ink 3 (no dye A) | 11.2 | 12 | 14.8 | 46.6 | 80.8 |

Dye B

Dye B

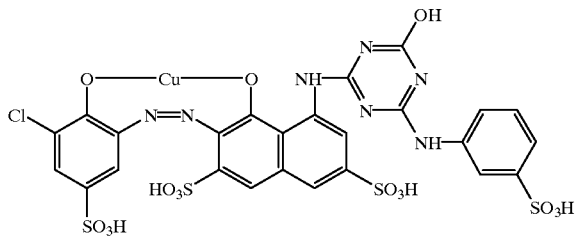

Dye B was prepared by dissolving Dye A from Example 1 in water and adding an approximately equimolar quantity of sodium hydroxide. The solution was then heated to 40° C. for 2 hours to yield Dye B. The dye was then salted out using NaCl and isolated as its sodium salt.

Dye (3)

Dye (3) was prepared as in Example 3.

Inks

The inks shown in Table 6 were prepared using the same method described in Example 1.

TABLE 6

| Ink | Component (Parts) | | | | | |
|---|---|---|---|---|---|---|
| | Dye B | Dye (3) | 2-Pyrrolidone | Thiodi-glycol | Surfynol 465 | Water |
| 7 | 0.3 | 2.7 | 5 | 5 | 2 | 85 |
| Comparative Ink 3 (No dye B) | 0 | 3.0 | 5 | 5 | 2 | 85 |

Ink Jet Printing

The inks shown in Table 6 were printed onto the papers shown in Table 7 using the same ink jet printer described in Example 1. The light fastness of the resulting prints shown in Table 7 was measured using the same method described in Example 1.

TABLE 7

| Ink | Light Fastness (ΔE) | | | | |
|---|---|---|---|---|---|
| | Xerox Acid | Xerox Alkaline | Conqueror | HP Coated | HP Glossy |
| Ink 7 | 11 | 11.8 | 12.7 | 38.4 | 79.2 |
| Comparative Ink 3 (No dye B) | 11.2 | 12 | 14.8 | 46.6 | 80.8 |

EXAMPLE 5

Dye B

Dye B was prepared as in Example 4.

Dye (4) (Water soluble magenta dye)

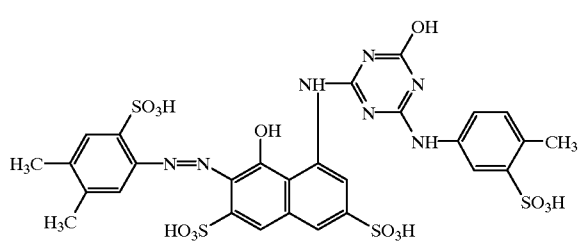

Dye (4)

Dye (4) was prepared by dissolving Dye (3) from Example 3 in water, adding an approximately equimolar quantity of NaOH and heating at 40 to 60° C. for about 2 hours. Dye (7) was isolated from this solution in the form of its sodium salt by adding NaCl and filtering the precipitated dye.

Inks

The inks shown in Table 8 were prepared using the same method described in Example 1.

TABLE 8

| Ink | Dye B | Dye (4) | 2-Pyrrolidone | Thiodi-glycol | Surfynol 465 | Water |
|---|---|---|---|---|---|---|
| Ink 8 | 0.3 | 2.7 | 5 | 5 | 2 | 85 |
| Comparative Ink 4 (no dye B) | 0 | 3.0 | 5 | 5 | 2 | 85 |

Ink Jet Printing

The inks shown in Table 8 were ink jet printed onto the papers shown in Table 9 as described in Example 1. The light fastness of the resulting prints shown in Table 9 were measured using the method described in Example 1.

TABLE 9

| | Light Fastness ($\Delta E$) | | | |
|---|---|---|---|---|
| Ink | Xerox Acid | Xerox Alkaline | Conqueror | HP Coated |
| Ink 8 | 11 | 11.8 | 12.7 | 38.4 |
| Comparative Ink 4 (no dye B) | 11.1 | 12.3 | 15.1 | 5.1 |

In Tables 1, 3, 5, 7 and 9 the following abbreviations are used for the paper substrates printed with the inks:
  Xerox Acid: Xerox Acid 4024 paper available from Xerox Corp. New York.
  Xerox Alkaline: Xerox Alkaline Ink Jet paper, available as above.
  Conqueror: Wiggins Conqueror paper, available from Argo Wiggins, UK.
  HP Coated: Ink Jet paper available from Hewlett Packard, San Diego, USA.
  HP Glossy: Ink Jet paper available as above.

EXAMPLE 6

Further dye compositions may be prepared having the following ingredients and amounts shown in Table 10. The amounts quoted in Table 10 refer to the number of parts by weight of each component. Dye (A), Dye (B) and Dyes (1) to (4) are as described in Examples 1 to 5; Dye (5) is a dye of the hereinbefore defined Formula (10) wherein $X^1$ is —OH; and Dye (6) is the hereinbefore defined dye of the Formula (18).

TABLE 10

| | Composition No. | | | | | | | | | | | | | | |
|---|---|---|---|---|---|---|---|---|---|---|---|---|---|---|---|
| Component | 1 | 2 | 3 | 4 | 5 | 6 | 7 | 8 | 9 | 10 | 11 | 12 | 13 | 14 | 15 |
| Dye (A) | 25 | 36 | 47 | 72 | | | 15 | | | 0.5 | 5 | 12 | 44 | 12.3 | |
| Dye (B) | | | | | 66 | 65.5 | | 20 | 5 | | 1 | | | | 24.8 |
| Dye (1) | 75 | | | | | | 85 | | | 99.5 | | | 56 | | |
| Dye (2) | | 64 | | | 34 | | | | | | | 5 | | 87.7 | |
| Dye (3) | | | 53 | 23 | | | | 80 | | | | 83 | | | |
| Dye (4) | | | | | | | | | 95 | | 94 | | | | 75.2 |
| Dye (5) | | | | | 5 | | | | | | | | | | |
| Dye (6) | | | | | | 34.5 | | | | | | | | | |

EXAMPLE 7

Inks (9) to (67) may be prepared having formulations described in Tables 11, 12 and 13 wherein the second column identifies the relevant dye composition from Table 10. The third column shows the amount of dye composition in the ink. All amounts are parts by weight. Thus, by way of example Ink (11) comprises:

| (a) | 10 parts | Composition (2) shown in Table 10 (36 parts of Dye (A) and 64 parts Dye (2)); |
|---|---|---|
| (b) | 85 parts | water; |
| (c) | 3 parts | propylene glycol; |
| (d) | 3 parts | N-methyl pyrrolidone; |
| (e) | 3 parts | pentane-1,5-diol; |
| (f) | 5 parts | glycerol; and |
| (g) | 1 part | 2-pyrrolidone |

The inks may be applied to paper by thermal or piezo ink jet printing.
The following abbreviations are used in Tables 11, 12 and 13:
  PG=propylene glycol
  DEG=diethylene glycol NMP=N-methyl pyrrolidone
TFP=2,2,3,3-tetrafluoropropanol
CYC=cyclohexanol
2P=2-pyrrolidone
P12 =propane-1,2-diol
UR=Urea
CET=cetyl ammonium bromide
PHO=$Na_2HPO_4$ and
TBT=tertiary butanol
TDG=thiodiglycol
GLY=glycerol
P-1,5 =Pentane-1,5diol
PEG 200=Polyethylene glycol (average molecular weight of 200)
H-1,6 =Hexane 1,6-diol
CAP=caprolactone
CAP-L=caprolactam
TEA=triethanolomine
DEG-MBE=diethylene glycol monobutyl ether
EA=ethanolamine
BUT=γ-butyrolactone

TABLE 11

| Ink | Dye Composition | Dye Content | Water | PG | DEG | NMP | P-1,5 | TEA | CYC | BUT | CAP | EA | CAP-L |
|---|---|---|---|---|---|---|---|---|---|---|---|---|---|
| 9 | 1 | 2.0 | 80 | 5 | | 6 | 4 | | | | | 5 | |
| 10 | 3 | 3.0 | 90 | | 5 | 4.8 | | 0.2 | | | | | |
| 11 | 2 | 10.0 | 85 | 3 | | 3 | 3 | | | 5 | | 1 | |
| 12 | 4 | 2.1 | 91 | | 8 | | | | 0.2 | | | | 1 |
| 13 | 5 | 3.1 | 86 | 5 | | | | | 0.2 | 4 | | | 4.8 |
| 14 | 6 | 1.1 | 81 | | | 9 | | 0.5 | 0.5 | | | 9 | |
| 15 | 7 | 2.5 | 60 | 4 | 15 | 3 | 3 | | | 6 | | 5 | 4 |
| 16 | 8 | 5 | 65 | | 20 | | 5 | | | 10 | | | |
| 17 | 9 | 2.4 | 75 | 5 | 4 | 5 | | | | | 6 | | 5 |
| 18 | 10 | 4.1 | 80 | 3 | 5 | 2 | 9.7 | | 0.3 | | | | |
| 19 | 11 | 3.2 | 65 | | 5 | 4 | 6 | | | 5 | 4 | 6 | 5 |
| 20 | 12 | 5.1 | 96 | | | | | | | | 4 | | |
| 21 | 13 | 10.8 | 90 | 5 | | | | | | 5 | | | |
| 22 | 14 | 10.0 | 80 | 2 | 6 | 2 | 5 | | | 1 | | 4 | |
| 23 | 15 | 1.8 | 80 | | 5 | | | | | | | 15 | |
| 24 | 1 | 2.6 | 84 | | | 11 | | | | | | 5 | |
| 25 | 7 | 3.3 | 80 | 2 | | 10 | | | | | 2 | | 6 |
| 26 | 9 | 12.0 | 90 | | | 7 | 0.3 | | | 2.7 | | | |
| 27 | 13 | 5.4 | 69 | 2 | 20 | 2 | 1 | | | | | 3 | 3 |

TABLE 12

| Ink | Dye Composition | Dye Content | Water | GLY | DEG | NMP | CET | TBT | TDG | UR | PHO | 2P | PI2 |
|---|---|---|---|---|---|---|---|---|---|---|---|---|---|
| 28 | 12 | 3.0 | 80 | 15 | | | 0.2 | | | | | 4.8 | |
| 29 | 2 | 9.0 | 90 | | | 5 | | | | | 1.2 | | 5 |
| 30 | 3 | 1.5 | 85 | 3.8 | 5 | | 0.16 | 4.64 | 0.2 | | | | |
| 31 | 4 | 2.5 | 90 | | 6 | | 3.88 | | | | 0.12 | | |
| 32 | 5 | 3.1 | 82 | 4 | 8 | | 0.3 | | | | | | 5.7 |
| 33 | 6 | 0.9 | 85 | | 10 | | | | | 4.8 | 0.2 | | |
| 34 | 7 | 8.0 | 90 | | 4.7 | 5 | | | 0.3 | | | | |
| 35 | 8 | 4.0 | 70 | | 10 | 4 | | | | 1 | | 4 | 11 |
| 36 | 9 | 2.2 | 75 | 4 | 10 | 3 | | | | 2 | | 6 | |
| 37 | 10 | 10.0 | 91 | | | 6 | | | | | | 3 | |
| 38 | 12 | 9.0 | 76 | | 9 | 7 | | 2.05 | | | 0.95 | 5 | |
| 39 | 11 | 5.0 | 78 | 5 | 11 | | | | | | | 6 | |
| 40 | 14 | 5.4 | 86 | | | 7 | | | | | | 7 | |
| 41 | 2 | 2.1 | 70 | 5 | 5 | 5 | 0.1 | 0.2 | 0.1 | 5 | 0.1 | 9.5 | |
| 42 | 1 | 2.0 | 90 | | 10 | | | | | | | | |
| 43 | 13 | 2 | 88 | | | 2 | | | | 10 | | | |
| 44 | 12 | 5 | 78 | | | 5 | | | | 12 | | 5 | |
| 45 | 10 | 8 | 70 | 2 | | 8 | | | | 15 | | 5 | |
| 46 | 14 | 10 | 80 | | | | | | | 8 | | 12 | |
| 47 | 7 | 10 | 80 | | 10 | | | | | | | | |

TABLE 13

| Ink | Dye Composition | Dye Content | Water | PEG 200 | DEG-MBE | NMP | H-1,6 | TEA | TFP | BUT | CAP | EA | CAP-L |
|---|---|---|---|---|---|---|---|---|---|---|---|---|---|
| 48 | 1 | 2.0 | 80 | 5 | | 6 | 4 | | | | | 5 | |
| 49 | 2 | 3.0 | 90 | | 5 | 4.8 | | 0.2 | | | | | |
| 50 | 2 | 10.0 | 85 | 3 | | 3 | 3 | | | 5 | | 1 | |

TABLE 13-continued

| Ink | Dye Composition | Dye Content | Water | PEG 200 | DEG-MBE | NMP | H-1,6 | TEA | TFP | BUT | CAP | EA | CAP-L |
|---|---|---|---|---|---|---|---|---|---|---|---|---|---|
| 51 | 4 | 2.1 | 91 | | 8 | | | | | | | | 1 |
| 52 | 5 | 3.1 | 86 | 5 | | | | | 0.2 | 3.8 | | | 5 |
| 53 | 6 | 1.1 | 81 | | | 9 | | 0.5 | 0.5 | | | 9 | |
| 54 | 7 | 2.5 | 60 | 4 | 15 | 3 | 3 | | | 6 | | 5 | 4 |
| 55 | 8 | 5 | 65 | | 20 | | | | | 10 | | | |
| 56 | 9 | 2.4 | 75 | 5 | 4 | | 5 | | | | 6 | | 5 |
| 57 | 10 | 4.1 | 80 | 3 | 5 | 2 | 9.7 | | 0.3 | | | | |
| 58 | 11 | 3.2 | 70 | | 5 | 4 | 6 | | | 5 | 4 | 6 | 5 |
| 59 | 12 | 5.1 | 96 | | | | | | | | 4 | | |
| 60 | 13 | 10.8 | 90 | 5 | | | | | | 5 | | | |
| 61 | 14 | 10.0 | 80 | 2 | | 6 | 2 | 5 | | 1 | | 4 | |
| 62 | 15 | 1.8 | 80 | | 5 | | | | | | | 15 | |
| 63 | 1 | 2.6 | 84 | | | 11 | | | | | | 5 | |
| 64 | 7 | 3.3 | 80 | 2 | | | 10 | | 0.3 | | 2 | | 6 |
| 65 | 8 | 12.0 | 90 | | | | 7 | 0.3 | | 2.8 | | | |
| 66 | 9 | 5.4 | 69 | 2 | 20 | 2 | 1 | | | | | 3 | 3 |
| 67 | 2 | 6.0 | 91 | | | 4 | | | | | | 5 | |

What is claimed is:

1. A composition comprising:
   (a) a water-soluble magenta dye; and
   (b) a dye of the Formula (1) or a salt thereof:

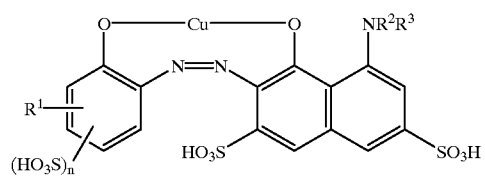

Formula (1)

wherein:
   $R^1$ is H, halo, vinyl sulphonyl or a group which is convertible to vinyl sulphonyl on treatment with aqueous alkali;
   $R^2$ is H or optionally substituted alkyl;
   $R^3$ is acetyl, optionally substituted benzoyl or a group of the Formula (2):

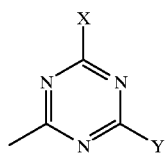

Formula (2)

X is a labile or a non labile atom or group;
Y is halo, $—NR^4R^5$, $—SR^5$ or $—OR^5$;
$R^4$ and $R^5$ each independently is H, optionally substituted alkyl, optionally substituted phenyl, or $R^4$ and $R^5$ together with the nitrogen to which they are attached form a 5 or 6 membered ring; and
n is 1.

2. A composition according to claim 1 wherein:
X is a quaternary ammonium group, halo, $—OR^6$, $—SR^6$ or $—NR^7R^8$; and $R^6$, $R^7$ and $R^8$ each independently is H, optionally substituted alkyl, optionally substituted alkenyl, optionally substituted cycloalkyl, optionally substituted aralkyl, optionally substituted aryl or $R^7$ and $R^8$ together with the nitrogen atom to which they are attached form a 5 or 6 membered ring.

3. A composition according to either claim 1 or claim 2 wherein:
X is selected from Cl, —OH and $—NHR^9$; and
$R^9$ is H, $C_{1-4}$-alkyl or hydroxy $C_{2-4}$-alkyl.

4. A composition according to any one of the preceding claims wherein
Y is $—NR^4R^5$ or $—OR^5$; and
$R^4$ and $R^5$ are each independently H, optionally substituted alkyl or optionally substituted phenyl.

5. A composition according to claim 1 wherein component (b) is a dye of the Formula (3), (4) or (5), or a salt thereof:

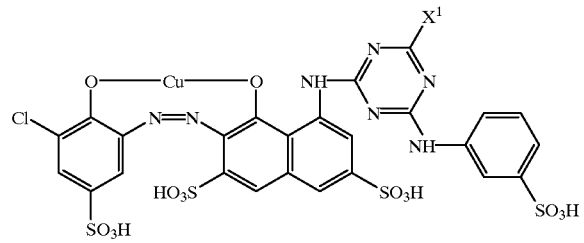

Formula (3)

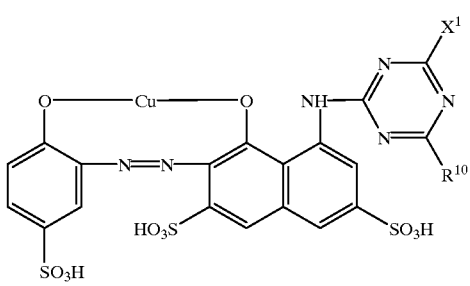

Formula (4)

Formula (5)

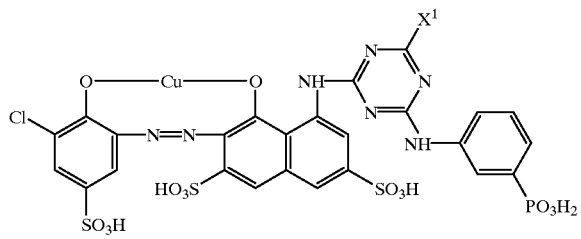

each $X^1$ independently is Cl, OH or —$NH_2$; and
$R^{10}$ is —$NH_2$ or phenoxy.

6. A composition according to claim 5 wherein component (b) is a dye of the Formula (3) wherein $X^1$ is Cl or —OH.

7. A composition according to any one of the previous claims wherein the water-soluble magenta dye has a maximum absorption wavelength in the range of from 490 to 550 nm.

8. A composition according to any one of the preceding claims wherein the water-soluble magenta dye is of the Formula (6A) or a salt thereof:

Formula (6A)

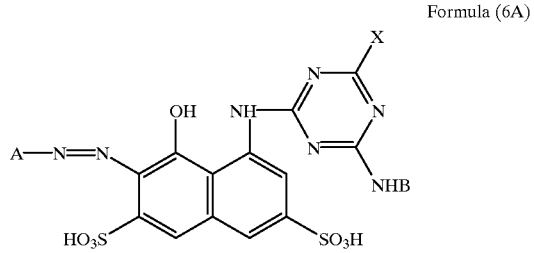

wherein:
each A and B independently is an optionally substituted aromatic group; and
X is a labile or non-labile group.

9. A composition according to any one of claims 1 to 7 wherein the water-soluble magenta dye is of the Formula (11) or a salt thereof:

$$Ar^1N=N-J-W-L-W-J-N=NAr^2 \quad \text{Formula (11)}$$

wherein:
each J independently is

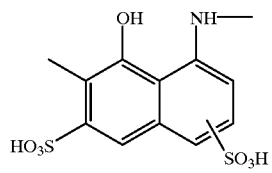

$Ar^1$ and $Ar^2$ are each independently aryl each of which carries one or two groups selected from carboxy and sulpho;

L is a divalent organic linking group;
each W independently is a group of the Formula (12), (13) or (14):

(12)

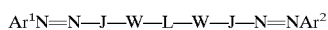

(13)

(14)

each Z independently is halogen, $NR^{12}R^{13}$, $SR^{14}$ or $OR^{14}$;
each Y independently is Z or H;
each E independently is Cl or CN; and
$R^{12}$, $R^{13}$ and $R^{14}$ are each independently H, optionally substituted alkyl, optionally substituted alkenyl, optionally substituted cycloalkyl, optionally substituted aryl, optionally substituted aralkyl or $R^{12}$ and $R^{13}$ together with the nitrogen atom to which they are attached form a 5 or 6 membered ring.

10. A composition according to any one of claims 1 to 7 wherein the water-soluble magenta dye is of the Formula (17) or a salt thereof:

Formula (17)

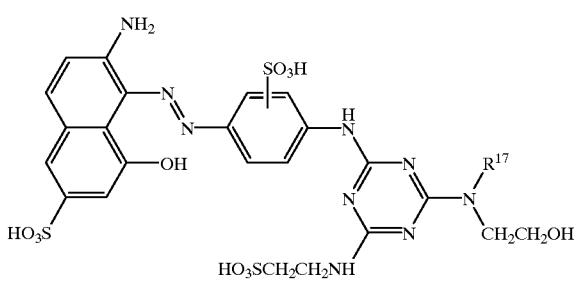

wherein:

$R^{17}$ is H or hydroxyethyl.

11. A composition according to any one of claims 1 to 7 wherein the water-soluble magenta dye is of the Formula (19) or a salt thereof:

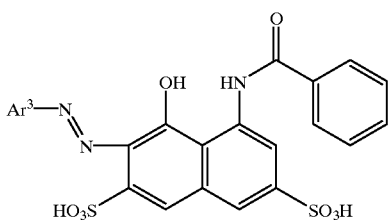

Formula (19)

wherein Ar³ is optionally substituted aryl.

12. A composition according to any one of the preceding claims comprising:
   (a) from 2 to 50 parts of a dye of Formula (1); and
   (b) from 50 to 98 parts of a water-soluble magenta dye;
wherein the parts are by weight and the sum of the parts (a) and (b)=100.

13. A composition comprising:
   (i) a composition according to any one of claims 1 to 12; and
   (ii) a cyan dye.

14. An ink comprising:
   (i) a composition according to any one of the preceding claims; and
   (ii) a liquid medium or a low melting point solid medium.

15. An ink according to claim 14 wherein the medium comprises (a), (b) or (c):
   (a) water;
   (b) a mixture of water and one or more organic solvent(s); or
   (c) an organic solvent.

16. An ink according to either claim 14 or claim 15 comprising:
   (a) 0.01 to 10 parts of a dye of Formula (1) or a salt thereof;
   (b) 0.49 to 20 parts of a water-soluble magenta dye;
   (c) 0 to 10 parts of a water-soluble cyan dye;
   (d) 2 to 60 parts of water-miscible organic solvent(s); and
   (e) 1 to 95 parts water;
wherein all parts are parts by weight and the sum of the parts (a), (b), (c), (d) and (e)=100.

17. A set of inks comprising:
   (i) a magenta ink comprising a composition according to any one of claims 1 to 12 and a medium;
   (ii) a cyan ink comprising a cyan colorant and a medium; and
   (iii) optionally one or more inks selected from a yellow ink and a black ink.

18. A process for printing a substrate comprising applying an ink to the substrate by means of an ink jet printer wherein the ink contains a composition according to any one of claims 1 to 13.

19. A paper, an overhead projector slide or a textile material printed with an ink as defined in any one of claims 14 to 16.

20. A process for the coloration of a textile material with an ink according to any one of claims 14 to 16 which comprises the steps:
   i) applying the ink to the textile material by means of an ink jet printer; and
   ii) heating the textile material at a temperature of from 50° C. to 250° C.

21. A textile material coloured by means of the process according to claim 20.

22. An ink jet printer cartridge containing an ink according to any one of claims 14 to 16.

* * * * *